FIP8102 XR 3,179,892 REFERENCE SEARCH ROOM

INVENTOR
N. E. CHASEK
BY
Sylvan Sherman
ATTORNEY

INVENTOR
N. E. CHASEK
BY
Sylvan Sherman
ATTORNEY

United States Patent Office 3,179,892

Patented Apr. 20, 1965

3,179,892
SELF-OSCILLATING DIODE DOWN-CONVERTER

Norman E. Chasek, Stamford, Conn., assignor to Bell Telephone Laboratories, Incorporated, New York, N.Y., a corporation of New York Filed Aug. 25, 1961, Ser. No. 133,951
1 Claim. (Cl. 325—449)

This invention relates to frequency converters and, in particular, to low noise, high frequency down-converters.

The use of a nonlinear, negative resistance to produce frequency down-conversion has been reported in the literature from time to time. (See volume 15, Radiation Laboratory Series, "Crystal Rectifiers," Chapter 13.) However, these early reported attempts, using welded-contact germanium crystals, were comparatively unsuccessful. Measurements showed that because of the large amount of intermediate frequency noise power generated by the crystals, the overall noise performance of such down-converters was inferior to the standard type of down-converters in spite of the amplifying properties of the crystals.

The advent of the so-called "Esaki" or "tunnel diode" has revived interest in negative resistance down-converters for low noise, high frequency applications. Since the noise figure is related to the product of the diode current and the slope of the diode voltage-current characteristic, the tunnel diode, because of the steeper slope of its voltage-current characteristic and the lower current range over which its negative slope is produced, is inherently capable of better noise figures. Notwithstanding this improved capability, unless the diode is properly utilized, no substantial improvement is realized.

It is, therefore, the broad object of this invention to improve the noise figure of a frequency converter using a diode as the nonlinear element.

The recently introduced parametric converters which utilize either a nonlinear capacitance or a nonlinear inductance as the active element have achieved good noise figures as up-converters. They have not been particularly efficient as down-converters, however, since the noise figure varies as a function of the ratio of the input frequency to the output frequency. However, since the nonlinearity of the tunnel diode used for frequency conversion is a resistance, rather than a reactance, the noise figure is essentially indepedent of the ratio of the input frequency to the output frequency.

It is, accordingly, a more specific object of this invention to improve the noise figure of a diode down-converter.

In addition to reducing the noise figure of the down-converter, there is the further problem of obtaining stable operation. This is particularly difficult if full advantage is to be taken of a negative resistance diode by operating it in its negative slope region.

It is, accordingly, a further object of this invention to improve the stability of diode down-converters operating over the negative slope region of the diode characteristic.

These and other objects are realized in accordance with the invention by biasing the diode in its negative conductance region. Advantageously, the diode is biased in the center of the negative conductance region. Simultaneously, the operation of the diode is stabilized at this point and the noise figure minimized by letting the diode also be its own local oscillator whose amplitude of oscillation is determined by a load whose conductance is equal to the load conductance of the signal circuit.

It has also been discovered that further improvements are realized by operating the local oscillator at half its usual frequency. Typically, the local oscillator operates at a frequency that is greater or less than the signal frequency by an amount equal to the intermediate frequency. In accordance with the invention, however, the local oscillator is advantageously tuned to one-half this difference frequency. This substantially eases the circuit design and provides improved gain performance.

These and other objects and advantages, the nature of the present invention, and its various features, will appear more fully upon consideration of the various illustrative embodiments now to be described in detail in connection with the accompanying drawings, in which.

Figure 1:
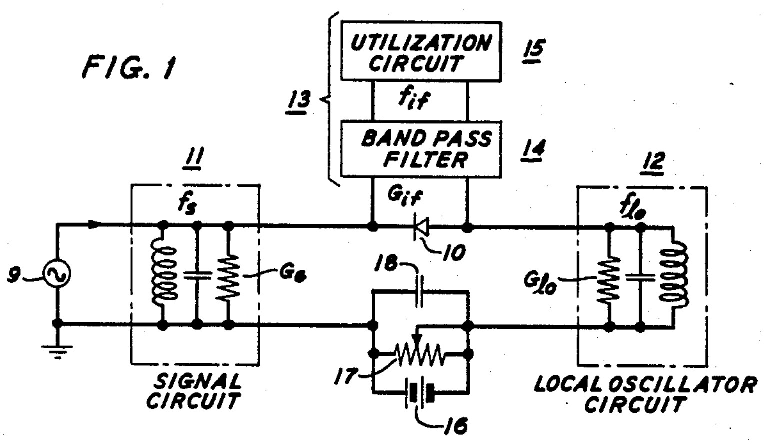
FIG. 1 is an equivalent circuit of a down-converter in accordance with the invention.

Referring more specifically to FIG. 1, there is shown the equivalent circuit of a down-converter in accordance with the invention comprising a signal source 9, a signal circuit 11, a local oscillator circuit 12, and an output circuit 13 which includes a band-pass filter 14 and a utilization circuit 15. Means for mutually coupling the various circuits is provided by a diode 10 which can be one of the type first described by Leo Esaki in an article entitled "New Phenomenon in Narrow Germanium p-n Junctions" published in the January 15, 1958 Physical Review, No. 109, pages 603–604 (also see "Tunnel Diodes" in the May 1960 Electrical Design News, page 50) or, more generally, can be any diode having a current versus voltage characteristic which includes a negative conductance region.

Diode 10 is biased by means of a source of direct current potential 16 through a rheostat 17. A by-jass capacitor 18 is connected across the bias circuit to provide a low impedance path for the various high frequency currents.

Typically, in a down-converter, a high frequency signal is applied to a variable impedance along with a local oscillator signal. The latter modulates the signal by moduating the variable impedance, creating sum and difference signals. Suitable filters are used to select from among the various frequency signals the desired signal.

It can be demonstrated that for the circuit shown in FIG. 1 the noise figure, N.F., defined as the ratio of the signal-to-noise power at the input to the signal-to-noise power at the output is given by $$N.F = 1 + \frac{G_e}{G_s} + (G_e + mG_{if})(G_0 + G_s)\left[\frac{4(G_0 + G_s)}{G_1^2 G_s}\right] \quad (1)$$

where $$G_e \text{ is given by } \frac{{}^{e}qI_0}{2kT},$$

$e_q$ being the charge per electron,
$k$ Boltzmann's constant,
T the temperature in degrees Kelvin and
$I_0$ the average diode current, and where $G_s$ is the equivalent conductance of the signal circuit,
$G_{if}$ is the intermediate frequency load conductance,
$mG_{if}$ is a factor introduced to account for noise generated in the intermediate frequency amplifier, where $m$ is a number equal to the noise temperature of the intermediate frequency amplifier divided by 270° K.,
$G_0$ is the average diode conductance, and $G_1$ is the peak conductance variation of the diode.

Since $G_0$ can be made negative by biasing the diode 10 in its negative conductance region, the noise figure is minimized by setting $$G_0 = -G_s \quad (2)$$

The term $(G_0+G_s)$ is then equal to zero and the noise figure reduces to $$N.F. = 1 + \frac{G_e}{G_s} \quad (3)$$

Thus, in accordance with the invention, the condition for optimum noise figure for a single diode down-converter is achieved by choosing the average conductance of the diode to be substantially equal to the negative of the signal source conductance.

The gain, under these conditions is given by $$A = 16\frac{G_s G_{if}}{G_1^2} \quad (4)$$

Since the low noise condition set forth above is dependent upon the average diode conductance, it is advantageous that some means be provided whereby this desired value of conductance is maintained throughout the life of the diode. In accordance with the invention, this end is realized by operating the diode as its own local oscillator. Specifically, the conductance of the local oscillator tuned circuit $G_{lo}$, is made substantially equal to the signal circuit conductance $G_s$. Since oscillations stabilize when the total conductance in the oscillator circuit is zero, the average diode conductance $G_0$ assumes a negative value whose amplitude is equal to the positive conductance $G_{lo}$ of the local oscillator tuned circuit. That is $$G_0 = -G_{lo} \quad (5)$$

However, since $G_{lo}=G_s$, this is also the condition for minimum noise figure. Furthermore, any change in the diode parameters due to aging or changes in the bias applied to the diode, automatically produces a change in the oscillator such that the preferred condition, namely $G_0=-G_s=-G_{lo}$, is maintained.

Referring again to FIG. 1, a signal derived from the signal circuit 11 at a frequency $f_s$ is applied to the diode 10 along with the local oscillator signal derived from the local oscillator circuit 12. The diode, being biased to operate in the negative conductance portion of its characteristic, acts as its own local oscillator. Simultaneously, the diode operates as a low noise amplifier whose gain is modulated at the local oscillator rate. Typically in prior art down-converters, the local oscillator frequency is adjusted to be greater or less than the signal frequency by an amount equal to a desired intermediate frequency, that is $$f_{lo} = (f_s \pm f_{if}) \quad (6)$$

The net effect is to produce an intermediate frequency signal at a frequency $f_{if}=|f_{lo}-f_s|$ which is applied to the utilization circuit 15 through the band-pass filter 14.

It has been further found, in accordance with the present invention, that substantial improvements can be realized by tuning the local oscillator circuit 12 to one-half its usual frequency. As indicated above, the local oscillator typically operates at a frequency that is greater or less than the signal frequency by an amount equal to the intermediate frequency. In accordance with this aspect of the invention, however, the local oscillator is advantageously tuned to one-half this frequency. That is, $$f_{lo} = \tfrac{1}{2}(f_s \pm f_{if}) \quad (7)$$

In addition to substantially improving the conversion gain characteristic of the down-converter, operating the local oscillator at this lower frequency substantially simplifies the down-converter circuit as will be explained in greater detail hereinafter.

Figure 2:
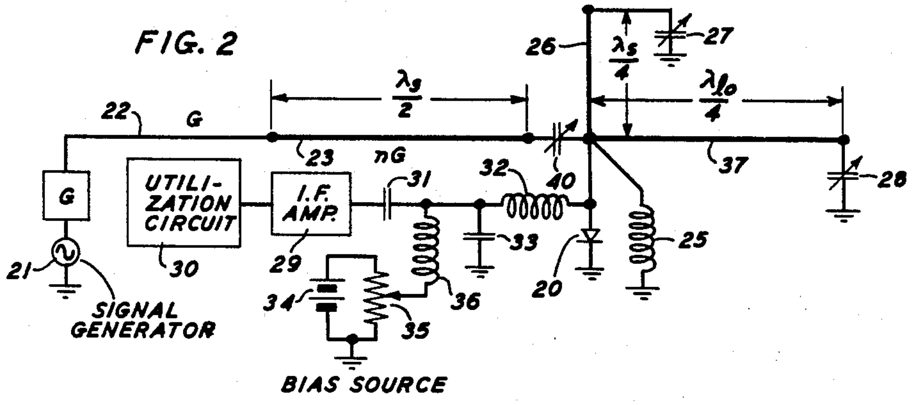
FIG. 2 shows schematically a circuit diagram of a first embodiment of the invention.

FIG. 2 shows schematically the circuit diagram of a down-converter, in accordance with the invention, utilizing a single diode 20 as a combination oscillator modulator. The input signal circuit comprises, in series, a signal generator 21, a length of transmission line 22 having a characteristic admittance G, and a second length of transmission line 23 having a characteristic admittance $n$G, where $n$ is any positive value, and a variable coupling capacitor 40. Generator 21 is matched to line 22 thereby terminating line 22 in its characteristic admittance.

Transmission lines 22 and 23 can be any of the well-known transmission media appropriate for the particular frequency range of operation. Thus, lines 22 and 23 can be made of hollow, conductively bounded waveguide or, alternatively, they can be made of any of the two conductor transmission media such as coaxial cable or strip transmission line.

Line 23 is adjusted to have an electrical length equivalent to one-half wavelength at the signal frequency. The reason for this and the manner in which the value of $n$ is determined will be explained in greater detail hereinafter.

The input signal circuit is connected to diode 20 and to the tuned portion of the signal circuit, which comprises an inductor 25, an open-ended quarter-wave tuning stub 26, and a small, variable trimmer capacitor 27. Diode 20, inductor 25 and stub 26 are connected in parallel with each other and in series with coupling capacitor 40. Capacitor 27 is located at the open end of stub 26 and provides a means for fine tuning the signal circuit.

Also connected in parallel with diode 20 is the local oscillator tuned circuit comprising the inductor 25 and a quarter-wave, open-ended tuning stub 37. A small trimmer capacitor 28 is connected at the open end of stub 37 and provides a means for fine tuning the local oscillator circuit.

The output circuit, comprising an intermediate frequency amplifier 29 and a utilization circuit 30, is connected to diode 20 through blocking capacitor 31 and a low-pass filter comprising a series inductor 32 and a shunt capacitor 33.

Bias current is applied to diode 20 from a source of potential 34 through potentiometer 35, a series choke 36, and inductor 32.

Figure 3:
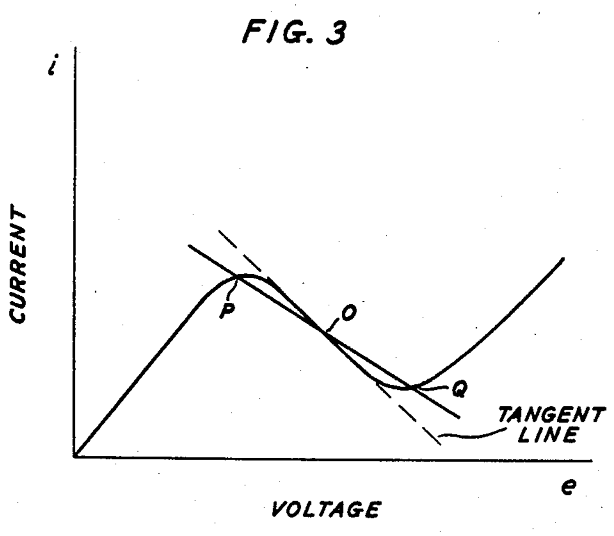
FIG. 3 shows, by way of explanation, a typical diode voltage-current characteristic and load line.

In the design and operation of the device, the diode 20, which typically has a voltage-current characteristic of the type shown in FIG. 3, is biased to a point O approximately in the middle of its negative conductance region by means of potentiometer 35. A load line is then drawn through point O so as to intersect the $e$–$i$ characteristic curve at two points P and Q.

In the discussion given above, it was demonstrated that optimum noise figure is obtained when $G_0=-G_s$. Under these conditions, the noise figure, as given by Equation 3, reduces to $$N.F. = 1 + \frac{G_e}{G_s}$$

Equation 3 also indicates that for low noise figures, $G_s$ (and hence $|G_0|$ should be as large as possible. The means that the slope of the load line should be as steep as possible. However, as the slope of the load line P–Q increases and ultimately becomes tangent to the $e$–$i$ curve (see dotted line in FIG. 3), operation becomes unstable. That is, slight deviations in the operating conditions cause large changes in the conversion gain of the circuit. Hence, a compromise is effected between best noise figure and stable conversion gain by reducing the slope of the load line by appropriate choice of the load so that the load line intersects the diode characteristic where the instantaneous conductance of the diode is approximately zero. This occurs in the region of the peak and valley of the curve. The average diode conductance $-G_0$ is then approximately equal to the slope of load line P–Q.

The initial tuning and loading procedure consists in adjusting the open-end stub 26 and trimmer 27 to reasonate inductor 25 at the signal frequency. The coupling capacitor 40 is then adjusted so that the net conductance of the signal circuit $G_s$ is equal in amplitude to the average diode conductance (i.e., the slope of load line P–Q) in accordance with the principles of the invention. That is, as viewed from the diode, the conductance of the signal circuit, as measured at the signal frequency, is made equal to the average diode conductance, $|G_0|=|G_s|$. This then satisfies the condition for minimum noise figure. As will be shown below, the tuning and loading procedure is repeated a number of times as certain adjustments in the embodiment of FIG. 2 are mutually dependent.

Similarly, the local oscillator circuit is initially tuned by adjusting stub 37 and trimmer 28 to resonate inductor 25 at the desired local oscillator frequency. In addition, since the conductance of diode 20 is to be stabilized at a conductance $|G_0=|G_s|$, the conductance $G_{lo}$ of the local oscillator circuit is adjusted by the proper selection of $n$ such that $G_{lo}=G_s$.

As indicated above, the local oscillator is tuned to one-half of the usual local oscillator frequency. That the circuit so adjusted operates satisfactorily can be seen by referring to the diode *i–e* curve of FIG. 3. With the local oscillator circuit tuned to frequency $\frac{1}{2}(f_s \pm f_{if})$ and the loading of the local oscillator adjusted such that the local oscillator conductance is equal to the slope of line P–Q, the instantaneous conductance of the diode assumes all values between P and Q, which points define the maximum voltage excursions of the local oscillator. It will be noted, however, that as the voltage varies between point Q and point P, the diode conductance varies at twice that rate, going from zero at point Q to a maximum at point O (given by the slope of the *i–e* curve) to zero at point P. Thus, the diode conductance varies at twice the local oscillator frequency and hence the signal is modulated at twice the local oscillator frequency.

While the signal circuit and the local oscillator circuit have been described as separate entities and, as will be explained below, to a considerable extent the tuning of each is substantially independent of the tuning of the other, it should be noted that in the embodiment of FIG. 2 these two circuits share a common inductor 25. In addition, as will be also shown hereinafter, the tuning of the signal circuit is influenced by the capacitance of the coupling capacitor 40 and the tuning of the local oscillator circuit is influenced by the value selected for $n$ and to a small degree by the capacitance of the coupling capacitor 40.

The relative independence of the signal and local oscillator circuits comes about by operating the local oscillator at one-half of what is generally considered to be the usual local oscillator frequency. As indicated above, by operating the local oscillator at this lower frequency, the performance of the down-converter can be substantially improved and the circuit considerably simplified. The circuit simplification arises as a result of the fact that the signal frequency is approximately twice the local oscillator frequency, since the signal frequency characteristically is much higher than the intermediate or output frequency. That is, $$f_{lo}=\tfrac{1}{2}(f_s \pm f_{if}), \qquad (8)$$

or $$f_{lo}\approx \tfrac{1}{2} f_s, \qquad (9)$$

since $$f_{if} << f_s$$

Accordingly, stub 37, which is approximately a quarter wavelength at the local oscillator frequency, is approximately a half wavelength long at the signal frequency, and the shunting effect of trimmer 28 upon the signal circuit is small. Similarly, stub 26, being a quarter wavelength long at the signal circuit, is only an eighth wavelength long at the local oscillator frequency, so that the shunting effect of stub 26 and trimmer 27 upon the tuning of the local oscillator circuit is also small. Thus, because of the essentially harmonic relationship of these frequencies, the two circuits are substantially independent of each nther and can, therefore, be separately tuned with a minimum of interaction.

In addition, transmission line 23 which is half a wavelength long at the signal frequency, is, accordingly, only a quarter wavelength long at the local oscillator frequency. As such, line 23 produces an admittance transformation at the local oscillator frequency but not at the signal frequency. For example, the admittance $g_{lo}$ seen at the local oscillator frequency looking towards signal source 21 from the end of line 23 is $$g_{lo}=n^2G \qquad (10)$$

However, there is no corresponding admittance transformation at the signal frequency and the admittance at the signal frequency is simply $$g_s=G \qquad (11)$$

The total equivalent admittance $Y_{lo}$ seen by the diode 20 at the local oscillator frequency is then $$Y_{lo}=\frac{g_{lo}\left[\frac{2L_{lo}}{C}+\omega^2L_{lo}^2\right]+jg_{lo}^2\frac{L_{lo}}{C}\left(j\omega L_{lo}+\frac{1}{j\omega C}\right)+j\omega L_{lo}}{g_{lo}^2\left(\frac{L_{lo}}{C}\right)^2-(\omega L_{lo})} \qquad (12)$$

where

C is the capacitance of capactor 40 and $L_{lo}$ is the total equivalent inductance at the local oscillator frequency due primarily to the combination of tuning stub 37, trimmer 28 and inductor 25.

The real part of $Y_{lo}$ is $G_{lo}$ and is given by $$Re\,Y_{lo}=G_{lo}=\frac{g_{lo}\left(2\frac{L_{lo}}{C}+\omega^2L_{lo}^2\right)}{g_{lo}^2\left(\frac{L_{lo}}{C}\right)^2-(\omega L_{lo})^2} \qquad (13)$$

Substituting for $g_{lo}$ from Equation 10 gives $$G_{lo}=\frac{n^2G\left(2\frac{L_{lo}}{C}+\omega^2L_{lo}^2\right)}{n^4G^2\left(\frac{L_{lo}}{C}\right)^2-(\omega L_{lo})^2} \qquad (14)$$

Similarly, the real part of the total equivalent admittance seen by the diode at the signal frequency is $$Re\,Y_s=G_s=\frac{G\left(2\frac{L_s}{C}+\omega^2L_s^2\right)}{G^2\left(\frac{L_s}{C}\right)^2-(\omega L_s)^2} \qquad (15)$$

where $L_s$ is the total equivalent inductance at the signal frequency due primarily to the combination of stub 26, trimmer 27 and inductor 25.

It will be noted that whereas both $G_{lo}$ and $G_s$ vary with changes in the coupling capacitor 40, only $G_{lo}$ is affected by changes in $n$. Hence, the net conductance of both the signal circuit and the local oscillator circuit can be independently adjusted by means of coupling capacitor 40 and the characteristic impedance of line 23. It will also be recognized that varying either the coupling capacitor 40 or the characteristic impedance of line 23 affects the tuning as well as the loading of the signal and the local oscillator circuits. The tuning process and the adjustments of the loadings are, accordingly, repeated until the tuning and loading of the diode are as required.

Ideally, the conductance of the signal circuit and the conductance of the local oscillator circuit are equal to each other and to the diode conductance. However, to insure that the diode oscillates at the local oscillator frequency and not the signal frequency, the loading of the signal circuit is made slightly more than the loading of the local oscillator circuit. That is, $G_s$ is made slightly larger than $G_{lo}$, thus favoring the local oscillator circuit.

In the embodiment according to FIG. 2 and in the discussion relating thereto, it is assumed that the signal source (signal generator 21) has substantially the same output admittance at both the signal frequency and at the local oscillator frequency. In the event, however, that this is not so, $n$ is either adjusted to take this into account or it may be necessary to provide a separate termination at each of these two frequencies. The latter arrangement is shown in FIG. 4.

Figure 4:
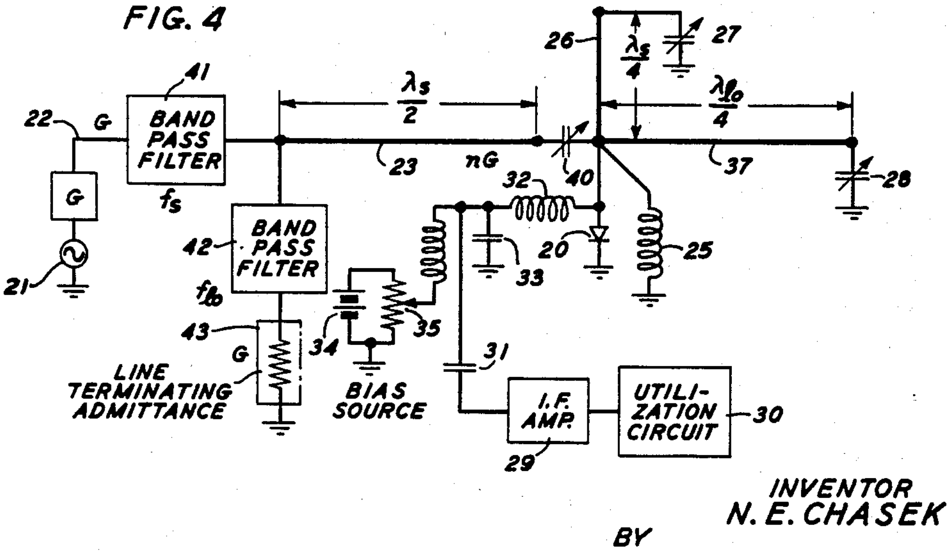
FIG. 4 is a schematic diagram of a second embodiment of the invention.

FIG. 4 is essentially the same as the embodiment of FIG. 2 except that a band-pass filter 41, centered at the signal frequency $f_s$, has been added in series with the signal input circuit. This effectively presents an open circuit at the local oscillator frequency. A separate termination is then provided for wave energy at the local oscillator frequency by the addition of a shunt branch comprising a bandpass filter 42 centered at the local oscillator frequency (and cutoff for the signal frequency) and the separate line terminating admittance 43, having an admittance G.

The arrangement of FIG. 4 thus insures that the signal input circuit is terminated at both the signal frequency and at the local oscillator frequency in an admittance G. In all other respects the operation of the arrangement of FIG. 4 is similar to that of FIG. 2 as described hereinabove.

In all cases it is understood that the above-described arrangements are merely illustrative of a small number of the many possible principles of the invention. Numerous and varied other arrangements can readily be devised in accordance with these principles by those skilled in the art without departing from the spirit and scope of the invention.

What is claimed is:

A down-converter comprising a signal circuit tuned to a first frequency $f_s$, an intermediate frequency circuit tuned to a second frequency $f_{if}$ and a local oscillator circuit tuned to a third frequency $f_{lo}$ where $f_{if}$ is small compared to $f_s$ and $f_{lo}$ is approximately equal to one-half $f_s$, nonlinear means mutually coupled to said circuits comprising a diode having a conductance characteristic which varies as a function of the bias applied thereto and includes a negative conductance region, means for biasing said diode in said negative conductance region, means for applying signal wave energy to said diode at said first frequency comprising, in cascade, a signal source having an admittance G, a half-wavelength of transmission line having a characteristic admittance $n$G, where $n$ is a positive value selected to fix the net conductance of said local oscillator circuit at a value $G_{lo}$, and a variable capacitance whose capacitance is seflected to fix the net conductance of said signal circuit at a value substantially equal to $G_{lo}$.

References Cited by the Examiner

UNITED STATES PATENTS 2,978,576 4/61 Watters -------------- 325—443

OTHER REFERENCES

Chang: "Low-Noise Tunnel-Diode Down Converter Having Conversion Gain," Proceedings of the IRE, May 1960, pp. 854–858.

DAVID G. REDINBAUGH, *Primary Examiner.*

ROY LAKE, *Examiner.*